(12) United States Patent
Choi et al.

(10) Patent No.: US 11,822,876 B2
(45) Date of Patent: Nov. 21, 2023

(54) SYSTEM AND METHOD FOR PROVIDING PERSONALIZED BOOK

(71) Applicant: WOONGJIN THINKBIG CO., LTD., Paju-si (KR)

(72) Inventors: Samrak Choi, Paju-si (KR); Uiyoung Kim, Paju-si (KR); Hyunjeong Cho, Paju-si (KR); Eun Han, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 0 days.

(21) Appl. No.: 18/086,123

(22) Filed: Dec. 21, 2022

(65) Prior Publication Data

US 2023/0196000 A1 Jun. 22, 2023

(30) Foreign Application Priority Data

Dec. 21, 2021 (KR) .......................... 10-2021-0183342

(51) Int. Cl.
*G06F 17/00* (2019.01)
*G06F 40/166* (2020.01)
(Continued)

(52) U.S. Cl.
CPC .......... *G06F 40/166* (2020.01); *G06F 3/0483* (2013.01); *G06F 16/337* (2019.01); *G06F 40/40* (2020.01)

(58) Field of Classification Search
CPC ...... G06F 40/166; G06F 40/40; G06F 16/337; G06F 3/0483; G06F 40/10; G06F 16/9035; G06F 16/38; G09B 5/062
See application file for complete search history.

(56) References Cited

U.S. PATENT DOCUMENTS 7,483,871 B2 * 1/2009 Herz .................. H04N 21/4332
8,190,618 B2 * 5/2012 Berstis .................... G06F 16/93
707/751

(Continued)

FOREIGN PATENT DOCUMENTS

JP 2012-137840 A 7/2012
KR 10-2008-0016028 A 2/2008
(Continued)

OTHER PUBLICATIONS

KR Office Action dated Feb. 25, 2022 as received in Application No. 1020210183342.
(Continued)

*Primary Examiner* — Laurie A Ries
(74) *Attorney, Agent, or Firm* — Maschoff Brennan

(57) ABSTRACT

This disclosure presents a system and a method for providing a personalized book in which an interested matter is analyzed based on reading history, and a personalized book is generated which includes personalized contents and illustrations based on the interested matter. The presented system for providing a personalized book includes a reading history database which stores a reading history associating a user identifier and a book identifier with each other, a book information database which stores book information including a book identifier, text data, and image data, and a service server configured to deduce an interested matter of a user based on the reading history of the user stored in the reading history database in response to a personalized book generation request from a user terminal, and to generate a personalized book based on the interested matter and the book information stored in the book information database.

16 Claims, 11 Drawing Sheets

(51) Int. Cl.
*G06F 3/0483* (2013.01)
*G06F 16/335* (2019.01)
*G06F 40/40* (2020.01)

(56) References Cited

U.S. PATENT DOCUMENTS

| | | | | |
|---|---|---|---|---|
| 8,515,816 | B2* | 8/2013 | King | G06V 30/142 |
| | | | | 705/37 |
| 9,026,934 | B1* | 5/2015 | Shah | G06F 15/0291 |
| | | | | 715/776 |
| 10,938,979 | B1* | 3/2021 | Dave | H04M 1/72454 |
| 10,977,431 | B1* | 4/2021 | Burke | G06F 40/166 |
| 11,188,584 | B1* | 11/2021 | Allen | G06F 16/345 |
| 2009/0112832 | A1* | 4/2009 | Kandogan | G06Q 10/10 |
| 2009/0172022 | A1* | 7/2009 | Bathiche | G06F 40/131 |
| 2013/0060763 | A1* | 3/2013 | Chica | G06F 16/335 |
| | | | | 707/E17.084 |
| 2013/0103525 | A1* | 4/2013 | Andrews | G06Q 30/06 |
| | | | | 705/26.1 |
| 2013/0262365 | A1* | 10/2013 | Dolbear | G06N 5/02 |
| | | | | 706/50 |
| 2014/0059476 | A1* | 2/2014 | Shin | G06Q 10/00 |
| | | | | 715/776 |
| 2015/0186491 | A1* | 7/2015 | Zukerman | G06F 16/337 |
| | | | | 707/740 |
| 2017/0220567 | A1* | 8/2017 | Masson | G06F 16/951 |
| 2018/0018309 | A1* | 1/2018 | Chun | G06F 40/169 |
| 2019/0155949 | A1* | 5/2019 | Castaneda | G06F 16/9038 |
| 2022/0075931 | A1 | 3/2022 | Choi et al. | |

FOREIGN PATENT DOCUMENTS

| | | | |
|---|---|---|---|
| KR | 10-1621391 | 5/2016 | |
| KR | 10-2020-0006672 A | 1/2020 | |
| KR | 10-2253521 B1 | 6/2021 | |
| WO | WO-2012118135 A1 * | 9/2012 | ....... G06F 17/30722 |

OTHER PUBLICATIONS

KR Decision to Grant dated Jun. 13, 2022 as received in Application No. 1020210183342.

* cited by examiner

[FIG. 1]
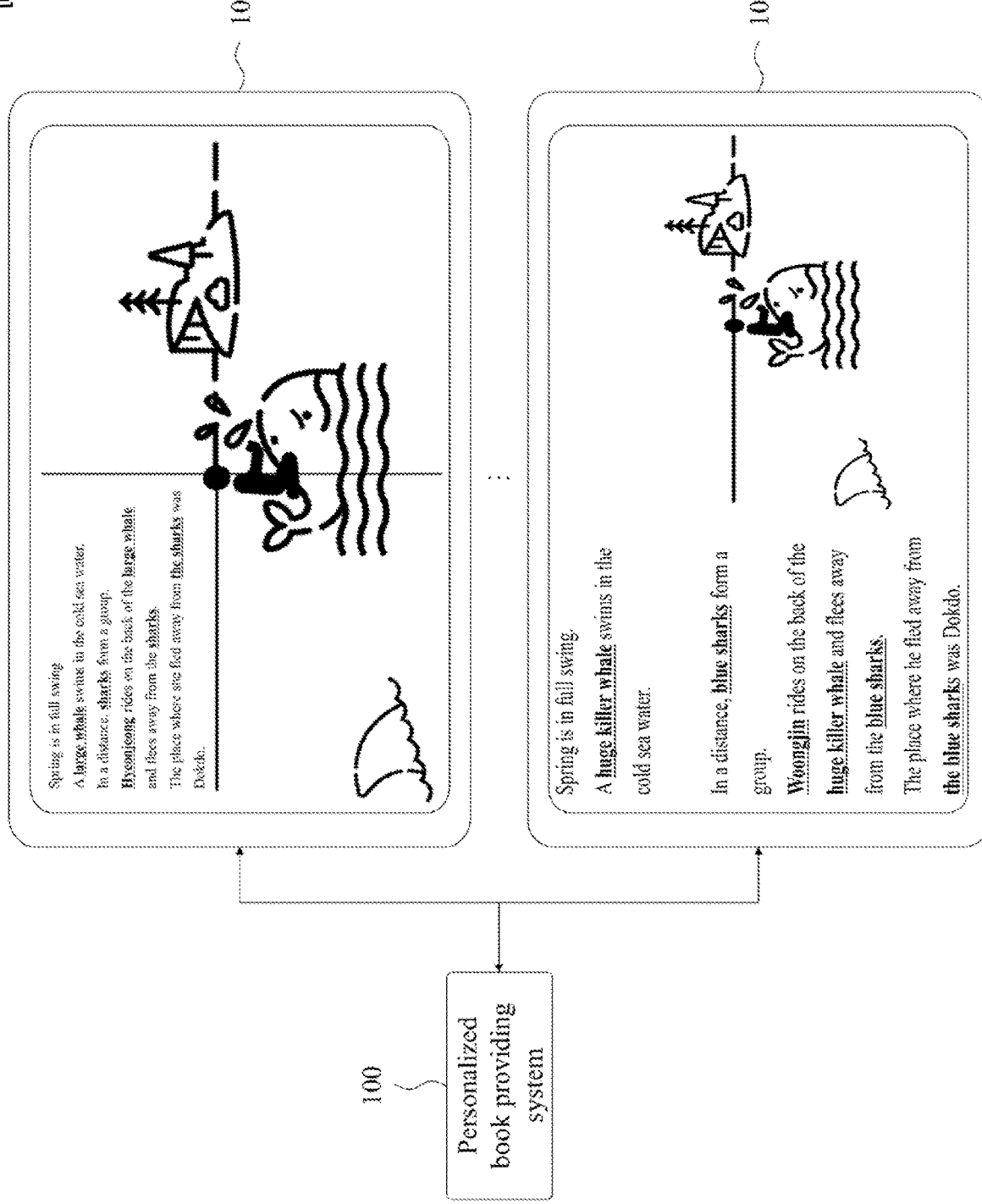

[FIG. 2]
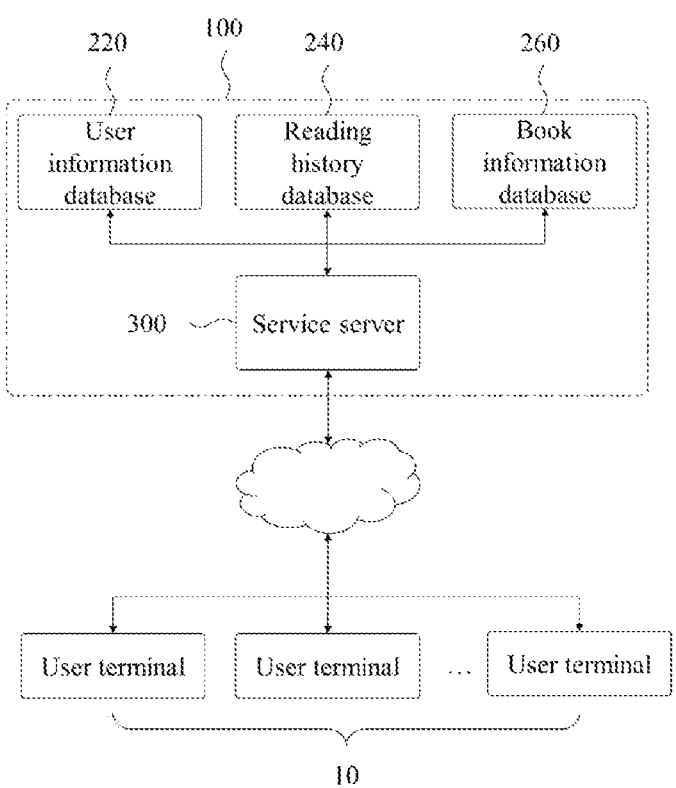

[Fig. 3]
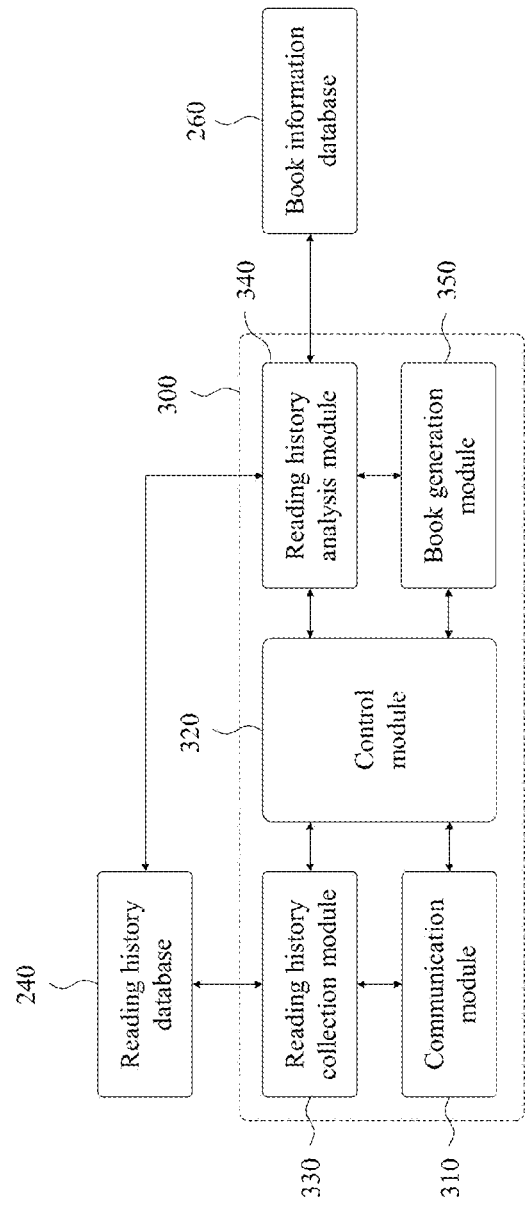

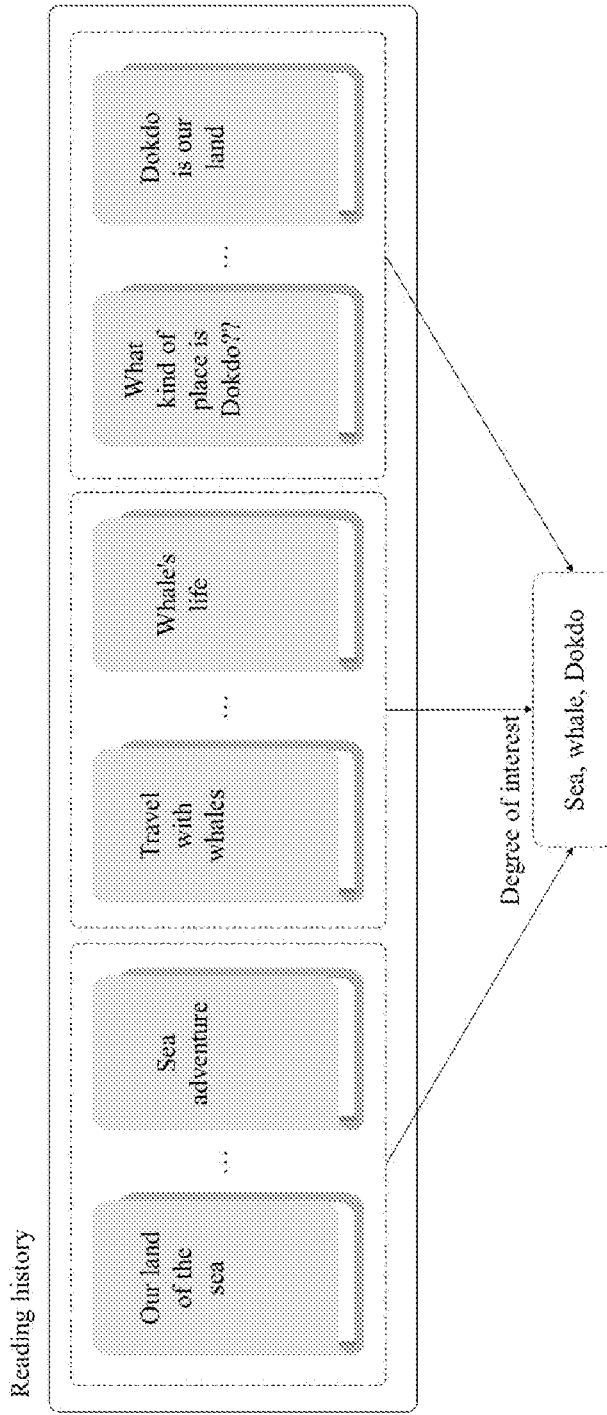
[Fig. 4]

[FIG. 5]
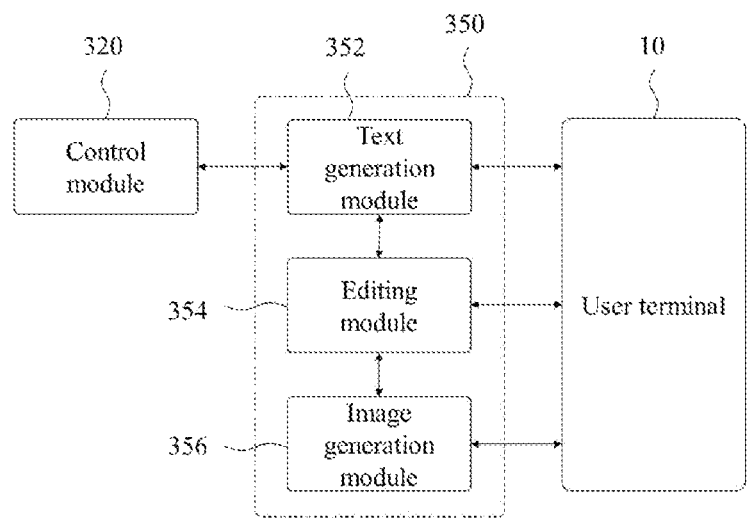
[FIG. 6]
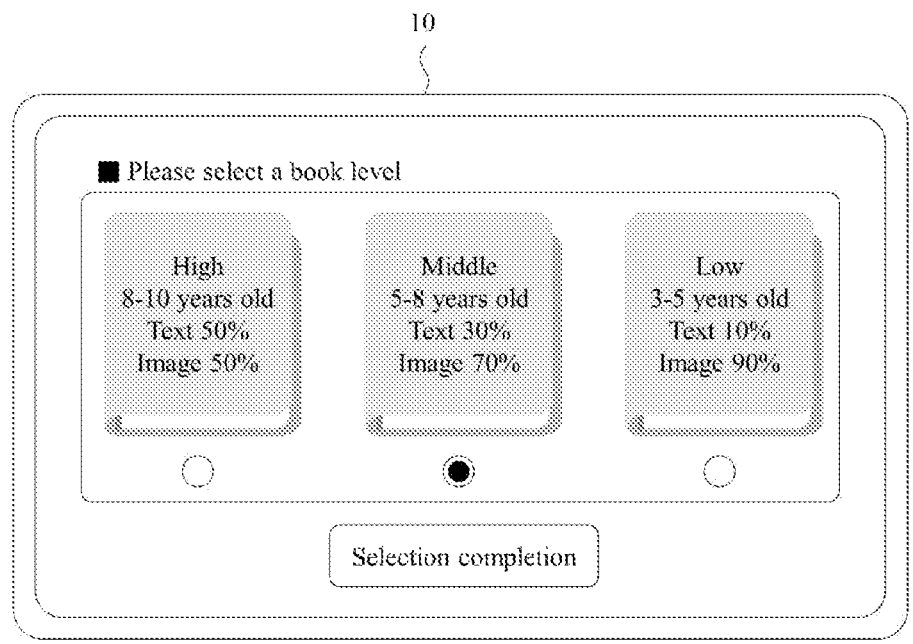

[FIG. 7]
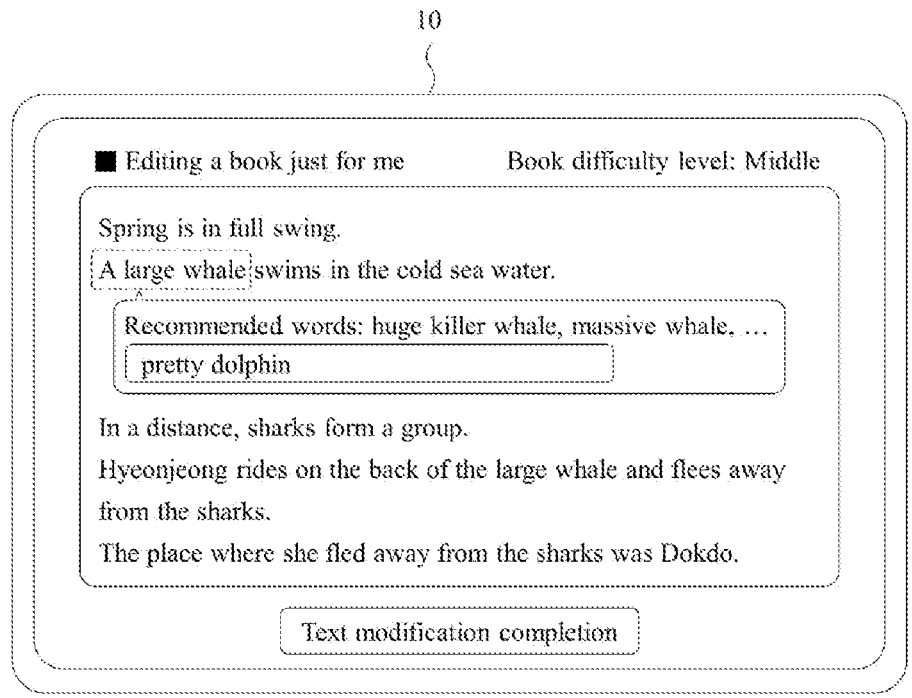
[FIG. 8]
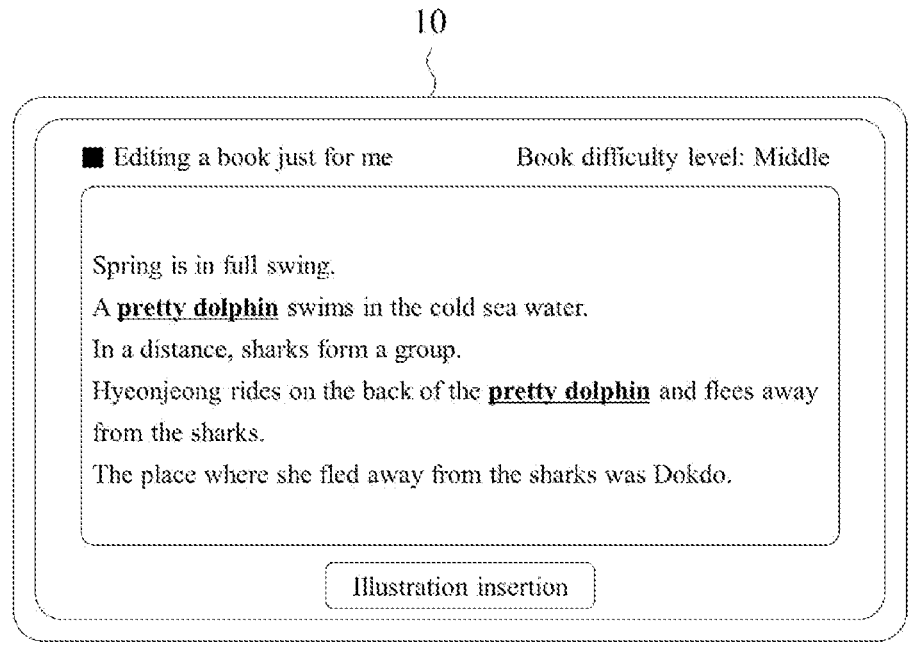

[FIG. 9]
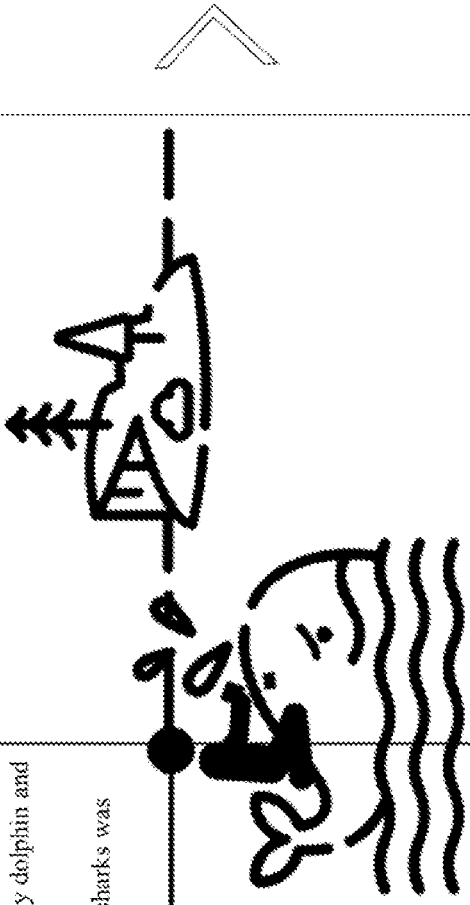

[FIG. 10]
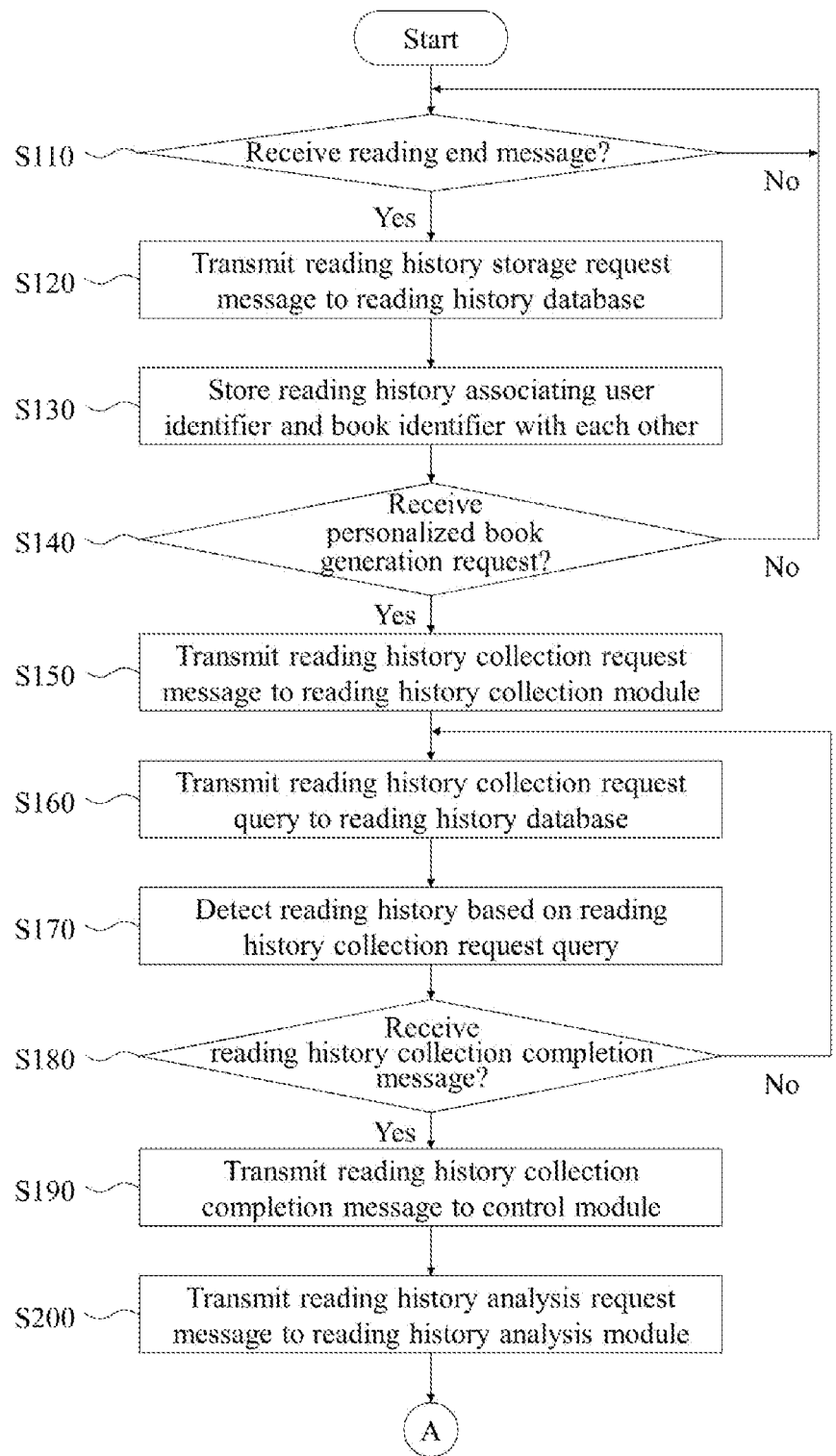

[FIG. 11]
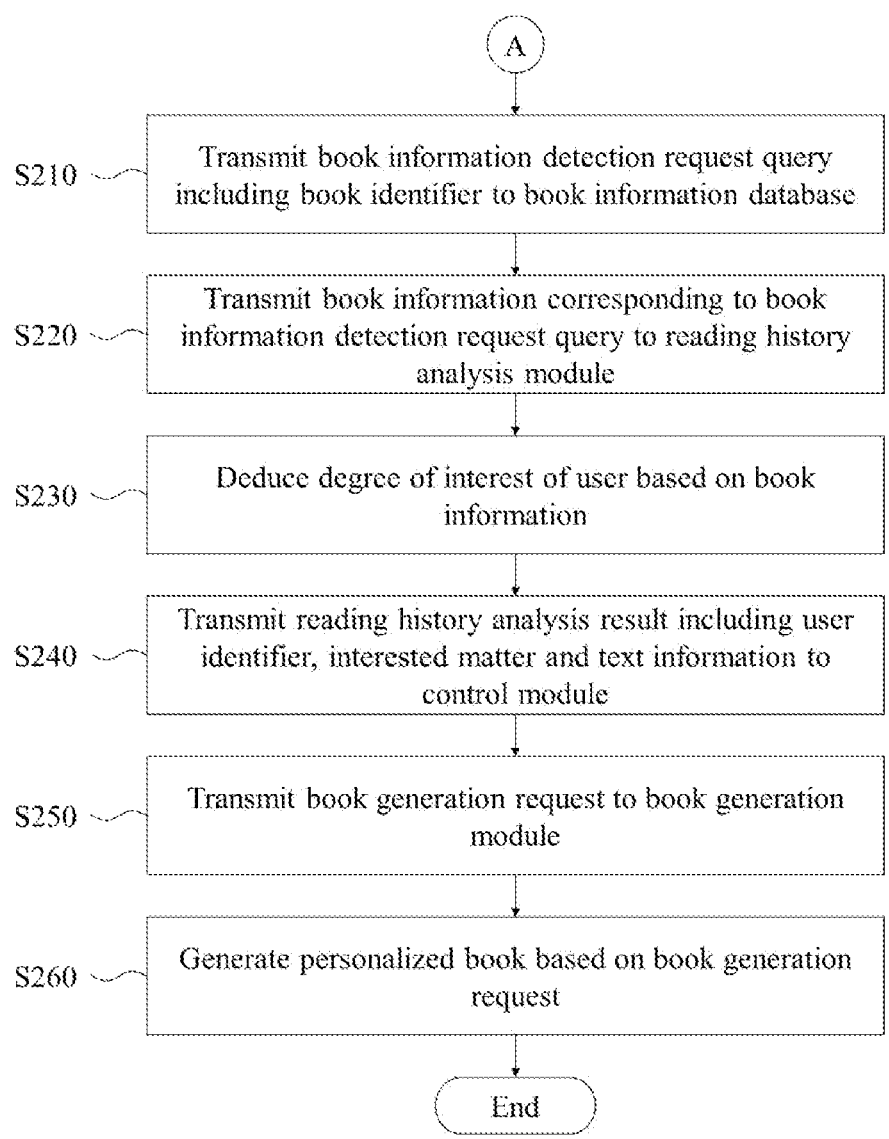

[FIG. 12]
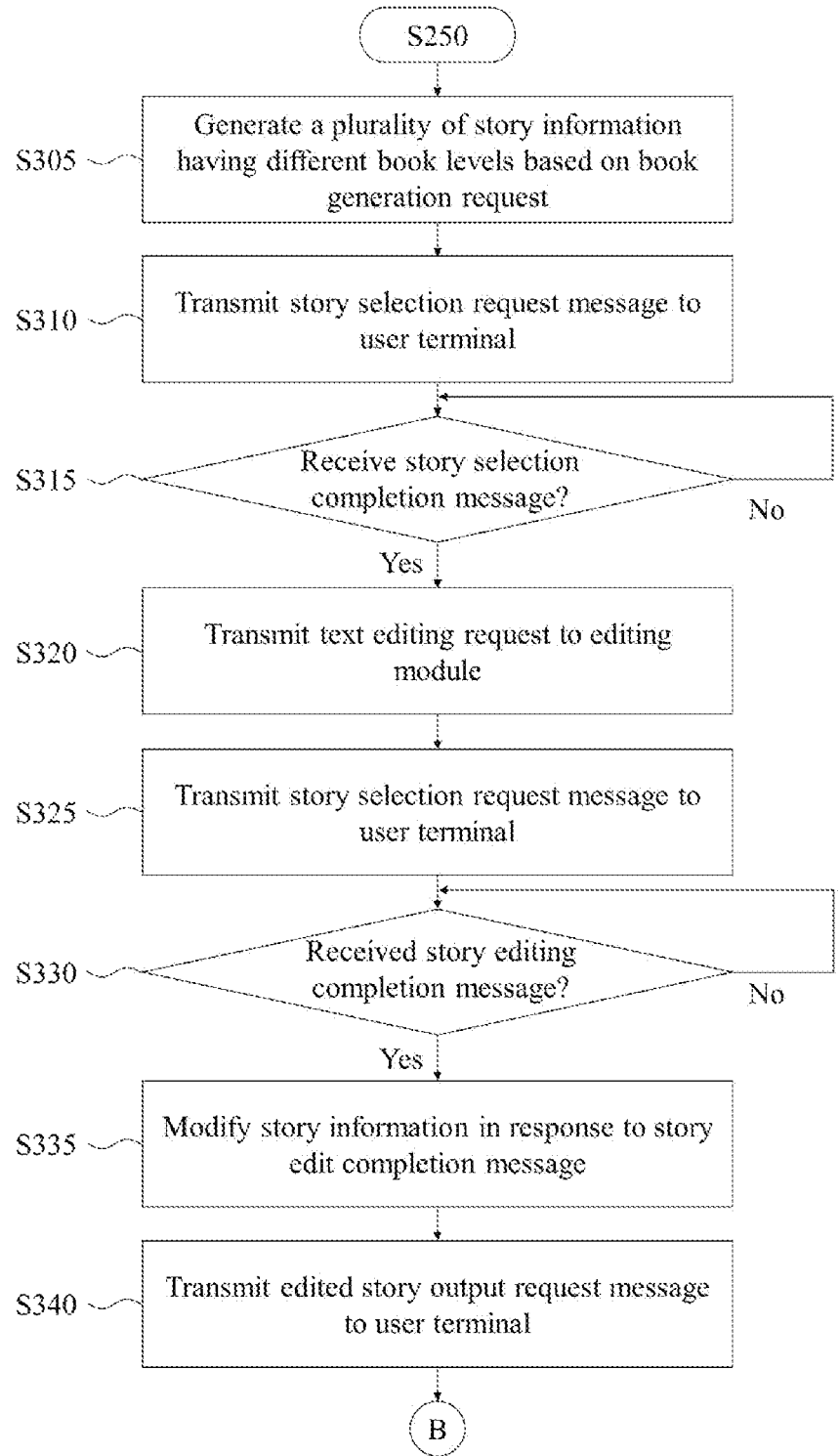

[FIG. 13]
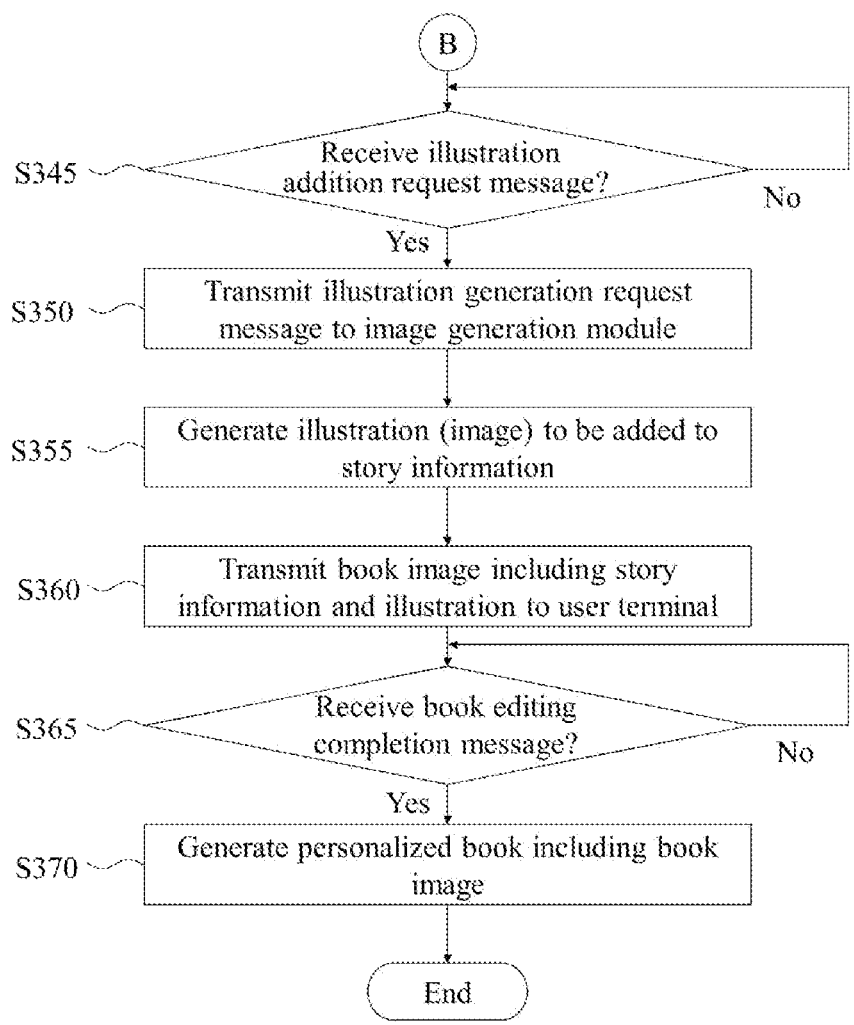

SYSTEM AND METHOD FOR PROVIDING PERSONALIZED BOOK

TECHNICAL FIELD

The present disclosure relates to a system and a method for providing a personalized book to a user.

BACKGROUND ART

Book making is one of the methods for increasing children's interest in reading. The book making is receiving attention from a range of fields from educational programs to production services.

In general, the book making is carried out in an analog way, such as children drawing pictures themselves under the guidance of an educator. Recently, the book making is developing in a digital way, such as digitizing a child's drawing or applying a child's name and photo to an existing story.

However, conventional book making is a method of applying information about a child to existing stories and illustrations, but it fails to properly utilize personalized information such as interested matters of children, and thus shows limitations in increasing interest in reading.

With the development of technology, artificial intelligence that can deduce users' tastes and interested matters through users' behaviors, and can perform roles such as voice synthesis or video synthesis is being developed and advanced. Due to the development of artificial intelligence, the demand for personalized services using artificial intelligence is increasing regardless of the service field.

Personalized elements in reading services are reflected in different ways in online and offline services. In the case of online reading services, they are provided in such a way as to recommend a book based on interested matters of a user or to produce an audio book through voice synthesis. This reflects the individualization factor in the provision method of the determined contents, and the content itself is not personalized.

In the case of an offline reading service that produces personalized book contents, since it is a case of synthesizing the user's name and photo with a set template (contents and illustrations), the contents that can be produced is limited, and there is a limitation that a lot of time is required to produce the contents.

It should be appreciated that the description provided in the background art is intended to help readers understand the background of the disclosure, and may include matters that are not publicly disclosed in the prior art.

Document of Related Art (Patent Document) Korean Patent No. 10-1621391

DISCLOSURE

Technical Problem

This disclosure has been proposed in view of the above circumstances, and is to provide a system and a method for providing a personalized book in which an interested matter is analyzed based on reading history, and a personalized book is generated which includes personalized contents and illustrations based on the interested matter.

Technical Solution

In order to achieve the above objectives, a system for providing a personalized book according to the present disclosure includes a reading history database which stores a reading history associating a user identifier and a book identifier with each other, a book information database which stores book information including a book identifier, text data, and image data, and a service server configured to deduce an interested matter of a user based on the reading history of the user stored in the reading history database in response to a personalized book generation request from a user terminal, and to generate a personalized book based on the interested matter and the book information stored in the book information database.

The service server may include a control module which outputs a reading history collection request message including a user identifier in response to the personalized book generation request of the user terminal, which, when receiving a reading history collection completion message in response to the reading history collection request message, outputs a reading history analysis request message including a reading history included in the reading history collection completion message, and which, when receiving a reading history analysis result in response to the reading history analysis request message, outputs a book generation request including a user identifier, an interested matter, and text information detected from the reading history analysis result, and a book generation module which detects a user identifier, a interested matter, and text information from the book generation request in response to the book generation request of the control module, which generates story information including a word among texts included in the text information, that is related to the interested matter wherein a plurality of story information having different levels of difficulty according to the level of sentences and vocabulary is generated, and which generates a personalized book by converting the text included in the story information selected by the user terminal into the text selected by the user terminal. The service server may further include a reading history collection module which transmits a reading history collection request query including a user identifier detected from the reading history collection request message to the reading history database in response to the reading history collection request message of the control module, and which, when receiving a response including a book identifier associated with the user identifier in response to the reading history collection request query, transmits a reading history collection completion message to the control module.

The service server may further include a reading history analysis module which transmits a book information detection request query including one or more book identifiers detected from the reading history analysis request message to the book information database in response to the reading history analysis request message of the control module, which, when receiving book information including text information associated to the one or more book identifiers in response to the book information detection request query, deduces an interested matter of a user based on the book information, and which transmits a reading history analysis result including the user identifier, the interested matter, and the text information to the control module.

The book generation module may generate story information which includes a first story information composed of sentences and vocabulary having a first difficulty level, a second story information composed of sentences and vocabulary having a second difficulty level higher than the first difficulty level, and a third story information composed of sentences and vocabulary having a third difficulty level higher than the second difficulty level.

The book generation module may include a text generation module which detects an interested matter and text information from the book generation request of the control module, which detects a story word that is a word related to the interested matter among words included in the text information, which generates a plurality of story information having different book levels based on the story word, and which outputs a text editing request including one of the plurality of story information in response to the story selection completion message of the user terminal, an editing module which transmits a story editing request message to the user terminal in response to the text editing request from the text generation module, which detects a selected text and a modified text from the received story editing completion message in response to the story editing request message, which generates story information by replacing a text identical to the selected text among texts of the story information with the modified text, which outputs an illustration generation request message including a book identifier, and which generates a personalized book including the story information and an illustration included in a response to the illustration generation request message, and an image generation module which generates an illustration based on image data included in book information corresponding to the reading history In response to the illustration generation request message of the editing module, and which transmits a response including the illustration to the editing module.

The editing module may transmit to the user terminal an edited story output request message including a link address of a page including a first area displaying texts included in story information, and a second area which, when one of the texts displayed in the first area is selected, is outputted to receive a modification text, and set a text selected in the user terminal among texts included in the first area as a selected text, and set a text inputted from the user terminal through the first area as a modified text.

The text generation module may change the story word and a sentence including the story word to a word having a different vocabulary level from the story word to generate story information having a different book level from the story information including the story word.

In order to achieve the above objectives, a method for providing a personalized book according to an embodiment of the present disclosure is a method for providing a personalized book performed by a service server which transmits and receives data to and from a user terminal, a reading history database, and a book information database, the method for providing a personalized book including: outputting, by a control module, a reading history collection request message including a user identifier when receiving a personalized book generation request from the user terminal, outputting, by the control module, a reading history analysis request message including a reading history included in a reading history collection completion message when receiving the reading history collection completion message in response to the reading history collection request message, outputting, by the control module, a book generation request including a user identifier, an interested matter, and text information detected from a reading history analysis result when receiving the reading history analysis result in response to the reading history analysis request message, detecting, by a book generation module, a user identifier, an interested matter, and text information from the book generation request in response to the book generation request, generating, by the book generation module, story information including a story word that is a word related to the interested matter among texts included in the text information detected in the detecting wherein a plurality of story information having different difficulty levels according to sentence and vocabulary levels is generated, and generating, by the book generation module, a personalized book by converting the text included in the story information selected by the user terminal into the text selected by the user terminal.

The system for providing a personalized book according to an embodiment of the present disclosure may further include transmitting, by a reading history collection module, a reading history collection request query including a user identifier detected from the reading history collection request message in response to the reading history collection request message, and outputting, by the reading history collection module, a reading history collection completion message to the control module when receiving a response including a book identifier associated with the user identifier in response to the reading history collection request query.

The system for providing a personalized book according to an embodiment of the present disclosure may further include: generating, by a reading history analysis module, a book information detection request query including one or more book identifiers detected from the reading history analysis request message in response to the reading history analysis request message, transmitting, by the reading history analysis module, the book information detection request query to the book information database, receiving, by the reading history analysis module, book information including text information associated with the one or more book identifiers in response to the book information detection request query, deducing, by the reading history analysis module, an interested matter of a user based on the book information, and transmitting, by the reading history analysis module, a reading history analysis result including the user identifier, the interested matter, and the text information to the control module.

The generating the plurality of story information may include generating story information which includes a first story information composed of sentences and vocabulary having a first difficulty level, a second story information composed of sentences and vocabulary having a second difficulty level higher than the first difficulty level, and a third story information composed of sentences and vocabulary having a third difficulty level higher than the second difficulty level.

The generating the plurality of story information may include detecting an interested matter and text information from the book generation request, detecting a story word among words included in the text information, which is a word related to the interested matter, and generating a plurality of story information having different book levels based on the story word.

The generating the personalized book may include outputting a text editing request including one of the plurality of story information in response to the story selection completion message of the user terminal, transmitting a story editing request message to the user terminal in response to the text editing request, detecting a selected text and a modified text from a story editing completion message received in response to the story editing request message, and generating story information by replacing a text among texts of the story information, which is identical to the selected text, with the modified text.

The generating the personalized book may further include generating an illustration based on image data included in book information corresponding to the reading history, and generating a personalized book including the illustration and the story information.

The outputting the text editing request may include transmitting an edited story output request message including a link address of a page including a first area displaying texts included in story information, and a second area which, when one of the texts displayed in the first area is selected, is outputted to receive a modification text, and the detecting the selected text and the modified text may include setting a text selected in the user terminal among texts included in the first area as a selected text, and setting a text inputted from the user terminal through the first area as a modified text.

The generating the plurality of story information may include changing the story word and a sentence including the story word to a word having a different vocabulary level from the story word to generate story information having a different book level from the story information including the story word.

Advantageous Effects

According to the present disclosure, the system and the method for providing a personalized book can have an effect of increasing the user's interest in reading by calculating interested matters of a user based on the user's reading history, and by providing a personalized book based on the reading history and the interested matter.

Additionally, the system and the method for providing a personalized book can have effects of enabling users to choose the suitable level of book difficulty by providing sentences and vocabulary by level when generating a personalized book, and of improving the user's writing skill and vocabulary.

Also, the system and the method for providing a personalized book can have an effect of increasing the user's interest in reading itself by generating the only personalized book in the world that reflects the user's interested matters, thereby deriving more attachment and interest than general books.

DESCRIPTION OF DRAWINGS

FIG. 1 is a diagram for explaining a system for providing a personalized book according to an embodiment of the present invention.

FIG. 2 is a diagram for explaining the construction of a system for providing a personalized book according to an embodiment of the present invention.

FIG. 3 is a diagram for explaining the configuration of the service server of FIG. 2.

FIG. 4 is a diagram for explaining the reading history analysis module of FIG. 3.

FIG. 5 is a diagram for explaining the configuration of the book generating module of FIG. 3.

FIGS. 6 to 9 are diagrams for explaining the book creation module of FIG. 3.

FIGS. 10 and 11 are flowcharts for explaining a method for providing a personalized book according to an embodiment of the present invention.

FIGS. 12 and 13 are flowcharts for explaining the generating the personalized book (S260) of FIG. 11.

MODE FOR INVENTION

Hereinafter, preferred embodiments of this disclosure will be described in detail with reference to the accompanying drawings.

Examples are provided to more fully explain the present disclosure to those of ordinary skill in the art, and the following examples may be modified into various other forms, and the scope of the present disclosure is not limited to the following examples. Rather, these examples are provided to make this disclosure more thorough and complete, and to fully convey the technical idea of the disclosure.

The terms used herein are used to describe specific embodiments and should not be construed as limiting the present disclosure. Also, in this specification, the use of the singular form term may include its corresponding plural objects, unless the context clearly indicates otherwise.

In the description of the embodiments, each layer (film), region, pattern or structures may be described as being formed "on" or "under" the substrate, each layer (film), region, pad or pattern, and it should be noted that such expression includes both being formed "directly" and "indirectly (or through another layer)" on and under it. Additionally, in principle, the reference for the top or bottom of each layer is based on the drawing.

The drawings are only for understanding the technical idea of the present disclosure, and should not be construed as limiting the scope of the present disclosure by the drawings. In addition, the relative thickness, length, or relative size in the drawings may be exaggerated for convenience and clarity of description.

Referring to FIG. 1, a system for providing a personalized book 100 (hereinafter referred to as book providing system 100) according to an embodiment of the present disclosure provides personalized books produced in a personalized manner for each user. To this end, the book providing system 100 deduces the user's interested matter based on the user's reading history, and provides the user with an electronic book whose contents are reconstructed based on the deduced interested matter. At this time, the book providing system 100 generates a plurality of electronic books having different vocabulary levels, and provides them to the user. The book providing system 100 presents the text of the electronic book selected by the user to the user so that the user can edit the text. The book providing system 100 generates a personalized book by adding images (i.e., illustrations) to the electronic book composed of texts which the user has edited. Accordingly, one book is provided to users with different vocabularies, and with text sizes, image positions and sizes, and the like set differently for each user.

Referring to FIG. 2, the book providing system 100 includes a user information database 220, a reading history database 240, a book information database 260, and a service server 300.

The user information database 220 stores user information. The user information database 220 stores user information associated with a user identifier, a user name, and the like.

The reading history database 240 stores a reading history that is user's reading activity history performed on the user terminal 10. For example, the reading history database 240 stores a reading history associated with learner identifiers, book identifiers, and the like.

The book information database 260 stores book information of all books provided to the user terminal 10. In an example, the book information database 260 stores book information including book identifiers, text data, and image data (i.e., illustrations) of books.

The service server 300 generates a personalized book by allowing the user terminal 10, the user information database 220, the reading history database 240, and the book information database 260 to interwork with each other, and the personalized book is provided to the user terminal 10.

Referring to FIG. 3, the service server 300 includes a communication module 310, a control module 320, a reading history collection module 330, a reading history analysis module 340, a book setting module, and a book generation module 350.

The communication module 310 is configured to transmit and receive data to and from the user terminal 10, the user information database 220, the reading history database 240, and the book information database 260. Hereinafter, if it is described that the reading history collection module 330, the control module 320, the reading history analysis module 340, the book setting module, and the book generation module 350 transmit and receive messages, data, and the like with the user terminal 10 and the databases 220, 240, and 260, it shall be regarded as being done through the communication module 310 unless otherwise specified.

The user terminal 10 outputs an embedded electronic book or an electronic book provided from the service server 300 in response to the user's reading start request. When the user completes reading, the user terminal 10 generates a reading end message, and transmits it to the service server 300. At this time, the user terminal 10 generates a reading end message including a user identifier and a book identifier.

The control module 320 generates a reading history storage request message in response to the reading end message of the user terminal 10, and transmits it to the reading history database 240. The control module 320 detects the user identifier and the book identifier from the reading end message. The control module 320 generates a reading history storage request query including the detected user identifier and book identifier, and transmits it to the reading history database 240.

The reading history database 240 stores the user's reading history in response to a reading history storage request query of the control module 320. The reading history database 240 detects the user identifier and the book identifier from the reading history storage request query. The reading history database 240 stores the detected user identifier and book identifier as a reading history while associating them with each other. The reading history database 240 transmits a reading history storage completion message to the control module 320 after completing the storage of the reading history.

The user terminal 10 generates a personalized book generation request message in response to the user's personalized book generation request. The user terminal 10 generates a personalized book generation request message including the user identifier. The user terminal 10 transmits the personalized book generation request message to the control module 320.

The control module 320 generates a reading history collection request message in response to the personalized book generation request message of the user terminal 10. The control module 320 detects the user identifier from the personalized book generation request message, and generates a reading history collection request message including the detected user identifier. The control module 320 transmits the generated reading history collection request message to the reading history collection module 330.

The control module 320 generates a reading history analysis request message in response to the reading history collection completion message of the reading history collection module 330, and transmits it to the reading history analysis module 340. The control module 320 detects the user identifier and reading history information from the reading history collection completion message. The control module 320 generates a reading history analysis request message including the detected reading history information, and transmits it to the reading history analysis module 340.

When receiving the reading history analysis result as a response to the reading history analysis request message from the reading history analysis module 340, the control module 320 generates a book generation request, and transmits it to the book generation module 350. At this time, the control module 320 detects the user identifier, the interested matter, and the text information from the reading history analysis result. The control module 320 generates a book generation request including the detected user identifier, the interested matter, and the text information, and transmits it to the book generation module 350.

The reading history collection module 330 collects the user's reading history in response to the reading history collection request message of the control module 320.

The reading history collection module 330 detects the user identifier from the reading history collection request message, and generates a reading history collection request query including the detected user identifier. The reading history collection module 330 transmits the reading history collection request query to the reading history database 240.

When receiving a response from the reading history database 240 to the reading history collection request message, the reading history collection module 330 generates a reading history collection completion message, and transmits it to the control module 320. At this time, the reading history collection module 330 generates a reading history collection completion message including the received reading history information in response to the reading history collection request message.

The reading history database 240 transmits the reading history to the reading history collection module 330 in response to the reading history collection request query of the reading history collection module 330. That is, the reading history database 240 detects the book identifier associated with the user identifier included in the reading history collection request query. The reading history database 240 transmits reading history information including the reading history including one or more book identifiers and the user identifier to the reading history collection module 330.

The reading history analysis module 340 analyzes the user's reading history in response to the reading history analysis request message of the control module 320.

The reading history analysis module 340 detects reading history information from the reading history analysis request message, and detects the user identifier and the one or more book identifiers from the reading history information. The reading history analysis module 340 generates a book information detection request query including one or more detected book identifiers, and transmits it to the book information database 260.

The book information database 260 transmits the book information to the reading history analysis module 340 in response to the book information detection request query of the reading history analysis module 340. That is, the book information database 260 detects one or more book identifiers from the book information detection request query. The book information database 260 detects text information associated with the detected book identifier. The book information database 260 generates book information including the detected text information, and transmits it to the reading history analysis module 340. In this case, the book information database 260 may generate book information including one or more keywords matched for each book information and text information of the book information, and transmit it to the reading history analysis module 340.

When receiving the book information in a response to the book information detection request query, the reading history analysis module 340 analyzes the book information to deduce the user's interested matter. The reading history analysis module 340 detects text data from book information. The reading history analysis module 340 segments text data into morpheme units. The reading history analysis module 340 analyzes the frequency of each word, the relationship between words, and the like to deduce the user's interested matter.

As an example, referring to FIG. 4, the books included in the user's reading history are "Our land of the sea", . . . , "Sea adventure", "Travel with whales", . . . , "Whale's life", "What kind of place is Dokdo?", . . . , and "Dokdo is our land", the reading history analysis module 340 deduces the interested matter of the user as follows: sea, whale, and Dokdo.

The reading history analysis module 340 generates the reading history analysis result including the user identifiers, the interested matter, and the text information. The reading history analysis module 340 transmits the reading history analysis result to the control module 320 in response to the reading history analysis request message.

The book generation module 350 generates a book to be provided to the user in response to the book generation request of the control module 320. The book generation module 350 detects the user identifiers, the interested matter, and the text information from the book generation request. The book generation module 350 generates new story information by selecting words related to the interested matter from among words included in text information.

For example, when the user's interested matter is "Yi Sun-shin" and the text information includes a word related to "camping", the book generation module 350 generates story information having contents about the user going camping with Yi Sun-shin.

The book generation module 350 generates a plurality of story information having different levels of difficulty according to sentences and vocabulary levels. As an example, the book generation module 350 generates a plurality of story information having the same contents, but different levels of sentences and vocabulary, so that it generates first story information of a high difficulty level, second story information of a middle difficulty level, and third story information of a low difficulty level.

The book generation module 350 provides a plurality of story information to the user terminal 10, and generates a personalized book by incorporating an image in the story information selected by the user terminal 10. At this time, the book generation module 350 displays the story information selected in the user terminal 10 on the user terminal 10, so that the user can edit words included in the story information.

Referring to FIG. 5, the book generation module 350 includes a text generation module 352, an editing module 354, and an image generation module 356.

The text generation module 352 generates a plurality of story information in response to the book generation request of the control module 320. The text generation module 352 detects the user identifier, the interested matter, and text information from the book generation request. The text generation module 352 detects words included in text information. The text generation module 352 detects story words, which are words related to the interested matter, from among the detected words. The text generation module 352 generates story information, which are book contents including the detected story words.

The text generation module 352 generates a plurality of story information having different book levels by differentiating story words or vocabulary levels of sentences including the story words. In an example, the text generation module 352 includes first story information having a vocabulary/sentence level of 'high', second story information composed of the same story as the first story information and having a vocabulary/sentence level of 'middle', and third story information composed of the same story as the first story information and the second story information and having a vocabulary/sentence level of 'low'.

The text generation module 352 displays a plurality of story information to which different book levels are set, and generates a story selection request message including a link address of a page and requesting selection of one of them. The text generation module 352 transmits a story selection request message to the user terminal 10 corresponding to the previously detected user identifier.

Referring to FIG. 6, the user terminal 10 accesses the link address in response to the story selection request message of the text generation module 352. Accordingly, a page displaying story information and requesting selection of one of them is output on the user terminal 10. The user terminal 10 generates a story selection completion message corresponding to the story selected by the user, and transmits it to the text generation module 352.

The text generation module 352 transmits a text editing request to the editing module 354 in response to the story selection completion message of the user terminal 10. The text generation module 352 generates a text editing request including the story information corresponding to the story selection completion message and the user identifier, and transmits the text editing request to the editing module 354.

The editing module 354 displays texts included in the story information in response to the text editing request of the text generation module 352, and generates a story editing request message including the link address of the page where one of these texts can be selected and edited (modified). The editing module 354 transmits a story selection request message to the user terminal 10 corresponding to the previously detected user identifier. The editing module 354 detects a user identifier from the text editing request, and transmits the story editing request message to the user terminal 10 corresponding to the detected user identifier.

Referring to FIG. 7, the user terminal 10 accesses the link address in response to the story editing request message of the editing module 354. Accordingly, a page configured to display the text included in the story information and to enable modification of the text is output to the user terminal 10.

After the user selects one of the displayed texts, inputs a text for modification, and selects a text modification completion button, the user terminal 10 generates a story editing completion message, and transmits it to the editing module 354. At this time, the user terminal 10 transmits the story editing completion message including the selected text and the modified text to the editing module 354.

The editing module 354 modifies the story information in response to the story editing completion message of the user terminal 10. The editing module 354 detects the selected text and the modified text from the story editing completion message, and replaces a text among the texts included in the story information, which is identical to the selected text, with the modified text.

The editing module 354 displays the modified story information, and transmits to the user terminal 10 an edited story output request message including a link address of a page configured to enable illustration addition.

Referring to FIG. 8, the user terminal 10 accesses the link address in response to the edited story output request message of the editing module 354. Accordingly, on the user terminal 10, the modified story information is displayed, and a page configured to enable illustration insertion is output. When the user selects an illustration insertion button, the user terminal 10 generates an illustration addition request message, and transmits it to the editing module 354.

The editing module 354 generates an illustration generation request message including the story information in response to the illustration addition request message of the user terminal 10. The editing module 354 generates an illustration generation request message including the story information, and transmits it to the image generation module 356.

The editing module 354 generates a book image including the story information and the illustration in response to the illustration generation completion message of the image generation module 356. That is, the editing module 354 detects the illustration from the illustration generation completion message, and generates the book image by combining the story information and the illustration. The editing module 354 generates a final confirmation request message including the link address of the page displaying the book image, and transmits it to the user terminal 10.

Referring to FIG. 9, the user terminal 10 accesses the link address in response to the final confirmation request message of the editing module 354. Accordingly, on the user terminal 10, the text modified by the user and the book image to which the illustration is added are displayed. When the user selects the completion button, the user terminal 10 generates a book editing completion message, and transmits it to the editing module 354.

The editing module 354 generates a personalized book including the generated book image in response to the book editing completion message of the user terminal 10. The editing module 354 generates a book storage request including the personalized book, and transmits it to the user terminal 10.

The user terminal 10 stores the personalized book in response to the book storage request of the editing module 354.

The image generation module 356 generates an illustration (image) to be added to the story information in response to the illustration generation request message of the editing module 354. The image generation module 356 newly generates an illustration related to the story information. The image generation module 356 may also generate an illustration by detecting an illustration included in a book corresponding to the reading history and by editing the detected illustration. The image generation module 356 transmits the illustration generation completion message including the illustration to the editing module 354.

Hereinafter, with reference to the accompanying drawings, a method for providing a personalized book according to an embodiment of the present disclosure will be described below.

Referring to FIGS. 10 and 11, the user terminal 10 outputs an embedded electronic book or an electronic book provided from the service server 300 in response to the user's reading start request. When the user completes the reading, the user terminal 10 generates the reading end message including the user identifier and the book identifier, and transmits this message to the service server 300. When receiving the reading end message from the user terminal 10 (S110; Yes), the control module 320 detects a user identifier and a book identifier from the reading end message, generates the reading history storage request query including the detected user identifier and the book identifier, and transmits it to the reading history database 240 (S120).

The reading history database 240 detects the user identifier and the book identifier from the reading history storage request message. The reading history database 240 stores the detected user identifier and book identifier as a reading history while associating them with each other (S130). The reading history database 240 transmits a reading history storage completion message to the control module 320 after completing the storage of the reading history.

The user terminal 10 generates the personalized book generation request message including the user identifier in response to the user's personalized book generation request, and transmits it to the service server 300. When receiving the personalized book generation request message from the user terminal 10 (S140; Yes), the control module 320 detects the user identifier from the personalized book generation request message, generates the reading history collection request message including the detected user identifier, and transmits it to the reading history collection module 330 (S150).

The reading history collection module 330 transmits the reading history collection request query to the reading history database 240 in response to the reading history collection request message (S160). The reading history collection module 330 detects the user identifier from the reading history collection request message, and generates a reading history collection request query including the detected user identifier. The reading history collection module 330 transmits the reading history collection request query to the reading history database 240.

The reading history database 240 detects the reading history information in response to the reading history collection request query (S170). That is, the reading history database 240 detects the book identifier associated with the user identifier included in the reading history collection request query. The reading history database 240 transmits reading history information including the reading history including one or more book identifiers and the user identifier to the reading history collection module 330.

When receiving the response of the reading history database 240 to the reading history collection request message (S180; Yes), the reading history collection module 330 generates the reading history collection completion message, and transmits it to the control module 320 (S190). At this time, the reading history collection module 330 generates a reading history collection completion message including the received reading history information in response to the reading history collection request message.

The control module 320 generates a reading history analysis request message in response to the reading history collection completion message of the reading history collection module 330, and transmits it to the reading history analysis module 340 (S200). The control module 320 detects the user identifier and reading history information from the reading history collection completion message. The control module 320 generates a reading history analysis request message including the detected reading history information, and transmits it to the reading history analysis module 340.

The reading history analysis module 340 detects reading history information from the reading history analysis request message, and detects the user identifier and the one or more book identifiers from the reading history information. The reading history analysis module 340 generates a book information detection request query including one or more detected book identifiers, and transmits it to the book information database 260 (S210).

The book information database 260 transmits the book information to the reading history analysis module 340 in response to the book information detection request query of the reading history analysis module 340 (S220). That is, the book information database 260 detects one or more book identifiers from the book information detection request query. The book information database 260 detects text information associated with the detected book identifier. The book information database 260 generates book information including the detected text information, and transmits it to the reading history analysis module 340. In this case, the book information database 260 may generate book information including one or more keywords matched for each book information and text information of the book information, and transmit it to the reading history analysis module 340.

When receiving the book information in a response to the book information detection request query, the reading history analysis module 340 analyzes the book information to deduce the user's interested matter (S230). The reading history analysis module 340 detects text data from book information. The reading history analysis module 340 segments text data into morpheme units. The reading history analysis module 340 analyzes the frequency of each word, the relationship between words, and the like to deduce the user's interested matter.

The reading history analysis module 340 generates the reading history analysis result including the user identifiers, the interested matter, and the text information. The reading history analysis module 340 transmits the reading history analysis result to the control module 320 in response to the reading history analysis request message (S240).

The control module 320 generates the book generation request in response to the reading history analysis result of the reading history analysis, and transmits it to the book generation module 350 (S250). At this time, the control module 320 detects the user identifier, the interested matter, and the text information from the reading history analysis result. The control module 320 generates a book generation request including the detected user identifier, the interested matter, and the text information, and transmits it to the book generation module 350.

The book generation module 350 generates a personalized book to be provided to the user in response to the book generation request of the control module 320 (S260). The book generation module 350 detects the user identifiers, the interested matter, and the text information from the book generation request. The book generation module 350 generates new story information by selecting words related to the interested matter from among words included in text information.

Referring to FIGS. 12 and 13, the text generation module 352 generates a plurality of story information having different book levels in response to the book generation request of the control module 320 (S305). The text generation module 352 detects the user identifier, the interested matter, and text information from the book generation request. The text generation module 352 detects words included in text information. The text generation module 352 detects story words, which are words related to the interested matter, from among the detected words. The text generation module 352 generates story information, which are book contents including the detected story words.

At this time, the text generation module 352 generates the plurality of story information having different book levels by differentiating story words or vocabulary levels of sentences including the story words. In an example, the text generation module 352 includes first story information having a vocabulary/sentence level of 'high', second story information composed of the same story as the first story information and having a vocabulary/sentence level of 'middle', and third story information composed of the same story as the first story information and the second story information and having a vocabulary/sentence level of 'low'.

The text generation module 352 displays a plurality of story information to which different book levels are set, and generates a story selection request message including a link address of a page and requesting selection of one of them. The text generation module 352 transmits a story selection request message to the user terminal 10 corresponding to the previously detected user identifier (S310).

The user terminal 10 accesses the link address in response to the story selection request message of the text generation module 352. Accordingly, a page displaying story information and requesting selection of one of them is output on the user terminal 10. The user terminal 10 generates a story selection completion message corresponding to the story selected by the user, and transmits it to the text generation module 352. When receiving the story selection completion message from the user terminal 10 (S315; Yes), the text generation module 352 transmits a text editing request to the editing module 354 in response to the story selection completion message of the user terminal 10 (S320). The text generation module 352 generates a text editing request including the story information corresponding to the story selection completion message and the user identifier, and transmits the text editing request to the editing module 354.

The editing module 354 displays texts included in the story information in response to the text editing request of the text generation module 352, and generates a story editing request message including the link address of the page where one of these texts can be selected and edited (modified). The editing module 354 transmits a story selection request message to the user terminal 10 corresponding to the previously detected user identifier (S325). The editing module 354 detects a user identifier from the text editing request, and transmits the story editing request message to the user terminal 10 corresponding to the detected user identifier.

The user terminal 10 accesses the link address in response to the story editing request message of the editing module 354. Accordingly, a page configured to display the text included in the story information and to enable modification of the text is output to the user terminal 10. After the user selects one of the displayed texts, inputs a text for modification, and selects a text modification completion button, the user terminal 10 generates a story editing completion message, and transmits it to the editing module 354. At this time, the user terminal 10 transmits the story editing completion message including the selected text and the modified text to the editing module 354. When receiving the story editing completion message from the user terminal 10 (S330; Yes), the editing module 354 modifies the story information in response to the story editing completion message of the user terminal 10 (S335). That is, the editing module 354 detects the selected text and the modified text from the story editing completion message, and replaces a text among the texts included in the story information, which is identical to the selected text, with the modified text.

The editing module 354 displays the modified story information, and transmits to the user terminal 10 an edited story output request message including a link address of a page configured to enable illustration addition (S340).

The user terminal 10 accesses the link address in response to the edited story output request message of the editing module 354. Accordingly, on the user terminal 10, the modified story information is displayed, and a page configured to enable illustration insertion is output. When the user selects an illustration insertion button, the user terminal 10 generates an illustration addition request message, and transmits it to the editing module 354. When receiving an illustration addition request message from the user terminal 10 (S345; Yes), the editing module 354 generates the illustration generation request message including the story information in response to the illustration addition request message of the user terminal 10, and transmits it to the image generation module 356 (S350).

The image generation module 356 generates an illustration (image) to be added to the story information in response to the illustration generation request message of the editing module 354 (S355). The image generation module 356 newly generates an illustration related to the story information. The image generation module 356 may also generate an illustration by detecting an illustration included in a book corresponding to the reading history and by editing the detected illustration. The image generation module 356 transmits the illustration generation completion message including the illustration to the editing module 354.

The editing module 354 generates the book image including the story information and the illustration in response to the illustration generation completion message of the image generation module 356, and transmits it to the user terminal 10 (S360). That is, the editing module 354 detects the illustration from the illustration generation completion message, and generates the book image by combining the story information and the illustration. The editing module 354 generates a final confirmation request message including the link address of the page displaying the book image, and transmits it to the user terminal 10.

The user terminal 10 accesses the link address in response to the final confirmation request message of the editing module 354. Accordingly, on the user terminal 10, the text modified by the user and the book image to which the illustration is added are displayed. When the user selects the completion button, the user terminal 10 generates a book editing completion message, and transmits it to the editing module 354. When receiving the book editing completion message from the user terminal 10 (S365; Yes), the editing module 354 generates a personalized book including the generated book image in response to the book editing completion message of the user terminal 10 (S370). The editing module 354 generates a book storage request including the personalized book, and transmits it to the user terminal 10. The user terminal 10 stores the personalized book in response to the book storage request of the editing module 354.

The above description is merely illustrative of the technical idea of the present disclosure, and various modifications and changes can be made by those of ordinary skill in the art to which the present disclosure pertains, without departing from the essential characteristics of the present disclosure. Accordingly, the embodiments disclosed in the present disclosure are not for limiting, but for explaining the technical spirit of the present disclosure, and the scope of the technical idea of the present disclosure is not limited by these embodiments. The protection scope of the present disclosure should be construed by the following claims, and all technical ideas within the scope equivalent thereto should be construed as being included in the scope of the present disclosure.

[Description of reference numerals]

| | |
|---|---|
| 100: System for providing a personalized book | |
| 220: User information database | 240: Reading history database |
| 260: Book information database | 300: Service server |
| 310: Communication module | 320: Control module |
| 330: Reading history collection module | 340: Reading history analysis module |
| 350: Book generation module | 352: Text generation module |
| 354: Editing module | 356: Image generation module |

The invention claimed is:

1. A system for providing a personalized book comprising:
   a reading history database which stores a reading history associating a user identifier and a book identifier with each other;
   a book information database which stores book information including a book identifier, text data, and image data; and
   a service server configured to deduce an interested matter of a user based on the reading history of the user stored in the reading history database in response to a personalized book generation request from a user terminal, and to generate a personalized book based on the interested matter and the book information stored in the book information database,
   wherein the service server includes:
      a control module which outputs a reading history collection request message including a user identifier in response to the personalized book generation request of the user terminal, which, when receiving a reading history collection completion message in response to the reading history collection request message, outputs a reading history analysis request message including a reading history included in the reading history collection completion message, and which, when receiving a reading history analysis result in response to the reading history analysis request message, outputs a book generation request including a user identifier, an interested matter, and text information detected from the reading history analysis result; and
      a book generation module which detects a user identifier, a interested matter, and text information from the book generation request in response to the book generation request of the control module, which generates story information including a word among texts included in the text information, that is related to the interested matter wherein a plurality of story information having different levels of difficulty according to the level of sentences and vocabulary is generated, and which generates a personalized book by converting the text included in the story information selected by the user terminal into the text selected by the user terminal.

2. The system for providing a personalized book of claim 1, wherein the service server further includes a reading history collection module which transmits a reading history collection request query including a user identifier detected from the reading history collection request message to the reading history database in response to the reading history collection request message of the control module, and which, when receiving a response including a book identifier associated with the user identifier in response to the reading history collection request query, transmits a reading history collection completion message to the control module.

3. The system for providing a personalized book of claim 1, wherein the service server further includes a reading history analysis module which transmits a book information detection request query including one or more book identifiers detected from the reading history analysis request message to the book information database in response to the reading history analysis request message of the control module, which, when receiving book information including text information associated to the one or more book identifiers in response to the book information detection request query, deduces an interested matter of a user based on the book information, and which transmits a reading history analysis result including the user identifier, the interested matter, and the text information to the control module.

4. The system for providing a personalized book of claim 1, wherein the book generation module generates story information which includes a first story information composed of sentences and vocabulary having a first difficulty level, a second story information composed of sentences and vocabulary having a second difficulty level higher than the first difficulty level, and a third story information composed of sentences and vocabulary having a third difficulty level higher than the second difficulty level.

5. The system for providing a personalized book of claim 1, wherein the book generation module includes:
a text generation module which detects an interested matter and text information from the book generation request of the control module, which detects a story word that is a word related to the interested matter among words included in the text information, which generates a plurality of story information having different book levels based on the story word, and which outputs a text editing request including one of the plurality of story information in response to the story selection completion message of the user terminal;
an editing module which transmits a story editing request message to the user terminal in response to the text editing request from the text generation module, which detects a selected text and a modified text from the received story editing completion message in response to the story editing request message, which generates story information by replacing a text identical to the selected text among texts of the story information with the modified text, which outputs an illustration generation request message including a book identifier, and which generates a personalized book including the story information and an illustration included in a response to the illustration generation request message; and
an image generation module which generates an illustration based on image data included in book information corresponding to the reading history in response to the illustration generation request message of the editing module, and which transmits a response including the illustration to the editing module.

6. The system for providing a personalized book of claim 5, wherein the editing module is configured to:
transmit to the user terminal an edited story output request message including a link address of a page including a first area displaying texts included in story information, and a second area which, when one of the texts displayed in the first area is selected, is outputted to receive a modification text; and
set a text selected in the user terminal among texts included in the first area as a selected text, and set a text inputted from the user terminal through the first area as a modified text.

7. The system for providing a personalized book of claim 5, wherein the text generation module changes the story word and a sentence including the story word to a word having a different vocabulary level from the story word to generate story information having a different book level from the story information including the story word.

8. A method for providing a personalized book performed by a service server which transmits and receives data to and from a user terminal, a reading history database, and a book information database, the method for providing a personalized book comprising:
outputting, by a control module, a reading history collection request message including a user identifier when receiving a personalized book generation request from the user terminal;
outputting, by the control module, a reading history analysis request message including a reading history included in a reading history collection completion message when receiving the reading history collection completion message in response to the reading history collection request message;
outputting, by the control module, a book generation request including a user identifier, an interested matter, and text information detected from a reading history analysis result when receiving the reading history analysis result in response to the reading history analysis request message;
detecting, by a book generation module, a user identifier, an interested matter, and text information from the book generation request in response to the book generation request;
generating, by the book generation module, story information including a story word that is a word related to the interested matter among texts included in the text information detected in the detecting wherein a plurality of story information having different difficulty levels according to sentence and vocabulary levels is generated; and
generating, by the book generation module, a personalized book by converting the text included in the story information selected by the user terminal into the text selected by the user terminal.

9. The method for providing a personalized book of claim 8, further comprising:
transmitting, by a reading history collection module, a reading history collection request query including a user identifier detected from the reading history collection request message in response to the reading history collection request message; and
outputting, by the reading history collection module, a reading history collection completion message to the control module when receiving a response including a book identifier associated with the user identifier in response to the reading history collection request query.

10. The method for providing a personalized book of claim 8, further comprising:
generating, by a reading history analysis module, a book information detection request query including one or more book identifiers detected from the reading history analysis request message in response to the reading history analysis request message;

transmitting, by the reading history analysis module, the book information detection request query to the book information database;

receiving, by the reading history analysis module, book information including text information associated with the one or more book identifiers in response to the book information detection request query;

deducing, by the reading history analysis module, an interested matter of a user based on the book information; and transmitting, by the reading history analysis module, a reading history analysis result including the user identifier, the interested matter, and the text information to the control module.

11. The method for providing a personalized book of claim 8, wherein the generating the plurality of story information includes generating story information which includes a first story information composed of sentences and vocabulary having a first difficulty level, a second story information composed of sentences and vocabulary having a second difficulty level higher than the first difficulty level, and a third story information composed of sentences and vocabulary having a third difficulty level higher than the second difficulty level.

12. The method for providing a personalized book of claim 8, wherein the generating the plurality of story information includes:

detecting an interested matter and text information from the book generation request;

detecting a story word among words included in the text information, which is a word related to the interested matter; and generating a plurality of story information having different book levels based on the story word.

13. The method for providing a personalized book of claim 12, wherein the generating the personalized book includes:

outputting a text editing request including one of the plurality of story information in response to the story selection completion message of the user terminal;

transmitting a story editing request message to the user terminal in response to the text editing request;

detecting a selected text and a modified text from a story editing completion message received in response to the story editing request message; and generating story information by replacing a text among texts of the story information, which is identical to the selected text, with the modified text.

14. The method for providing a personalized book of claim 13, wherein the generating the personalized book further includes:

generating an illustration based on image data included in book information corresponding to the reading history; and generating a personalized book including the illustration and the story information.

15. The method for providing a personalized book of claim 13, wherein the outputting the text editing request includes transmitting an edited story output request message including a link address of a page including a first area displaying texts included in story information, and a second area which, when one of the texts displayed in the first area is selected, is outputted to receive a modification text, and wherein the detecting the selected text and the modified text includes setting a text selected in the user terminal among texts included in the first area as a selected text, and set a text inputted from the user terminal through the first area as a modified text.

16. The method for providing a personalized book of claim 8, wherein the generating the plurality of story information includes changing the story word and a sentence including the story word to a word having a different vocabulary level from the story word to generate story information having a different book level from the story information including the story word.

* * * * *